United States Patent
Venkatakrishnan et al.

(10) Patent No.: US 8,315,171 B2
(45) Date of Patent: Nov. 20, 2012

(54) ADAPTIVE MANAGEMENT OF COMPUTING RESOURCES

(75) Inventors: Bharath Venkatakrishnan, Chicago, IL (US); Amit Kumar Sharma, Karnataka (IN); Suraj Kumar Verma, Ranchi (IN)

(73) Assignee: Oracle America, Inc., Redwood City, CA (US)

( * ) Notice: Subject to any disclaimer, the term of this patent is extended or adjusted under 35 U.S.C. 154(b) by 581 days.

(21) Appl. No.: 11/590,997

(22) Filed: Oct. 31, 2006

(65) Prior Publication Data

US 2008/0104247 A1    May 1, 2008

(51) Int. Cl.
*H04J 3/14* (2006.01)
(52) U.S. Cl. ........................................ 370/236; 709/224
(58) Field of Classification Search ............... 370/236.1, 370/241.1, 250; 709/224, 226, 223, 229, 709/232; 718/104
See application file for complete search history.

(56) References Cited

U.S. PATENT DOCUMENTS

| | | | |
|---|---|---|---|
| 2005/0055590 A1* | 3/2005 | Farkas et al. | 713/320 |
| 2007/0041329 A1* | 2/2007 | Schine | 370/250 |
| 2007/0094668 A1* | 4/2007 | Jacquot et al. | 718/104 |
| 2008/0183865 A1* | 7/2008 | Appleby et al. | 709/224 |

* cited by examiner

*Primary Examiner* — Yemane Mesfin
*Assistant Examiner* — Leon Andrews
(74) *Attorney, Agent, or Firm* — Osha Liang LLP

(57) ABSTRACT

A method of managing a plurality of computing resources including obtaining a first load threshold and a second load threshold, obtaining a first load value and a second load value, comparing the first load threshold and the second load threshold with the first load value and the second load value, and changing an operating mode of a resource of the plurality of computing resources when both the first load threshold and the second load threshold are between the first load value and the second load value.

17 Claims, 4 Drawing Sheets

ADAPTIVE MANAGEMENT OF COMPUTING RESOURCES

BACKGROUND

A computing resource may include, for example, a server, a mainframe, a desktop PC, an active cluster, etc. Multiple computing resources may be grouped together to form what is known as a resource pool. A resource pool may be required to execute a variety of requests including, for example, a submitted computing job. A request may originate from any number of sources including a system user, a computing resource outside the resource pool, and/or another resource pool. The resource pool may be expected to execute a request within a certain time frame. The resource pool may also be expected to be available for executing requests at specific times. Expectations associated with a resource pool may be set forth in a service level agreement (SLA).

The number of requests requiring execution may be considered, at least in part, the computational load associated with the resource pool. A computational load may vary with time. For example, a computational load may reach a peak during certain times of the day, but may be almost zero at other times. The expectations set forth in a SLA may need to be satisfied at all times and regardless of the computational load.

A resource pool may require electrical power to execute requests. The electrical power consumed may be dependent on the number of resources in the resource pool actively executing requests. The consumption of electrical power may result in the generation of heat. Accordingly, a resource pool executing requests may need to be cooled by a cooling system. However, a cooling system may also consume electrical power while attempting to reduce the heat generated by the resource pool.

SUMMARY

In general, in one aspect, the invention relates to a method of managing a plurality of computing resources including obtaining a first load threshold and a second load threshold, obtaining a first load value and a second load value, comparing the first load threshold and the second load threshold with the first load value and the second load value, and changing an operating mode of a resource of the plurality of computing resources when both the first load threshold and the second load threshold are between the first load value and the second load value.

In general, in one aspect, the invention relates to a computer readable medium storing instructions for managing a plurality of resources, the instructions including functionality to obtain a first load threshold and a second load threshold, obtain a first load value and a second load value, compare the first load threshold and the second load threshold with the first load value and the second load value, and change an operating mode of a resource of the plurality of computing resources when both the first load threshold and the second load threshold are between the first load value and the second load value.

In general, in one aspect, the invention relates to a system for managing a plurality of computing resources including a user interface, a service level agreement, and a load manager accessible by the user interface with functionality to obtain a first load threshold and a second load threshold, obtain a first load value and a second load value, compare the first load threshold and the second load threshold with the first load value and the second load, and change an operating mode of a resource of the plurality of computing resources when both the first load threshold and the second load threshold are between the first load value and the second load value.

Other aspects of the invention will be apparent from the following description and the appended claims

DETAILED DESCRIPTION

Figure 1:
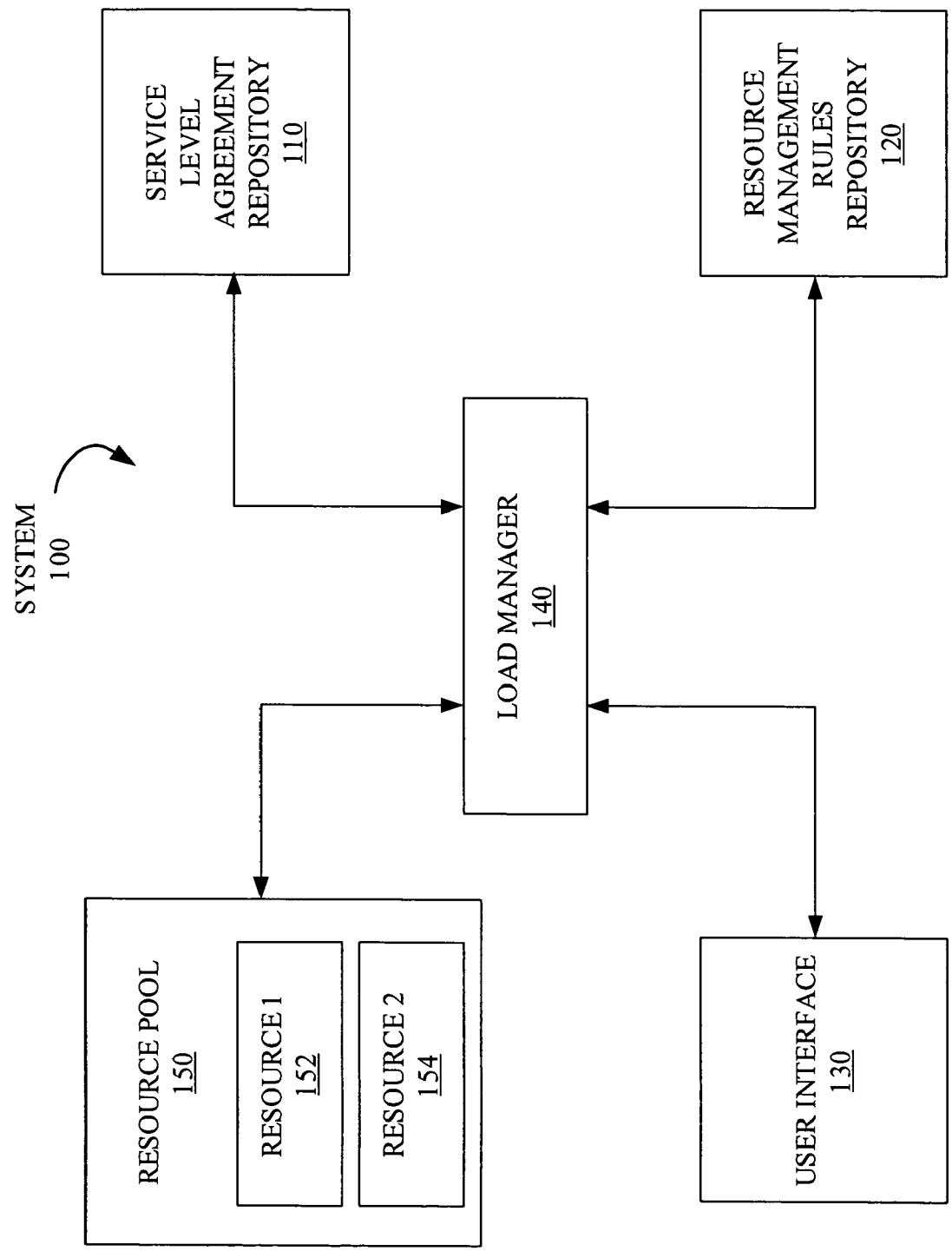
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to manage computing resources using multiple load thresholds. In general, embodiments of the invention provide a method and system to manage computing resources using multiple load thresholds and one or more service level agreements (SLAs).

FIG. 1 shows a system in accordance with one or more embodiments of the invention. As shown in FIG. 1, System (100) may have multiple components including a Load Manager (140), multiple repositories (Service Level Agreement Repository (110), Resource Management Rules Repository (120)), a Resource Pool (150) with multiple resources (Resource 1 (152), Resource 2 (154)), and a User Interface (130). Each of these components is described below. Some of these components may be located on the same device (e.g., a server, mainframe, desktop PC, laptop, PDA, telephone, mobile phone, etc.) or may be located on separate devices connected by a network (e.g., the Internet), with wired and/or wireless segments.

In one or more embodiments of the invention, Resource Pool (150) includes one or more resources (Resource 1 (152), Resource 2 (154), etc.). Each resource in Resource Pool (150) may be a server, a mainframe, a desktop PC, an active cluster, etc. In one or more embodiments of the invention, additional resources may be added to Resource Pool (150) and/or resources may be removed from Resource Pool (150).

In one or more embodiments of the invention, all resources in Resource Pool (150) are be linked by a network (e.g., a local area network, a wide area network, such as the Internet, etc.) with wired and/or wireless segments. One or more resources in Resource Pool (150) may form an active cluster and/or grid system paradigm. Each resource in Resource Pool (150) may operate in one of multiple operational modes (e.g., active mode, sleep mode, etc.). Each operational mode may be associated with a different level of electrical power consumption. For example, the active mode may be associated with full or high electrical power consumption while the sleep mode may be associated with minimal electrical power consumption. In one or more embodiments of the invention, each resource in Resource Pool (150) may be independently activated (i.e., placed in active mode) and/or deactivated (i.e., placed in sleep mode) (discussed below).

In one or more embodiments of the invention, the one or more resources of Resource Pool (150) execute requests (e.g., submitted computing jobs). The number of requests and/or the requirements of the requests (e.g., processing requirements, memory requirements, etc.) may be referred to as the computational load associated with Resource Pool (150). In one or more embodiments of the invention, Resource Pool (150) is designed based on a maximum expected computational load. A measurement representing the computational load associated with Resource Pool (150) at a given time may be referred to as a load value.

In one or more embodiments of the invention, Resource Pool (150) requires cooling while executing requests. Resource Pool (150) may be cooled by a cooling system (not shown) including cooling fans, air conditioning, and/or any other type of climate control system. Failure to cool Resource Pool (150) may result in undesirable performance and/or damage to one or more resources in Resource Pool (150). Operation of the cooling system may require additional electrical power consumption. In one or more embodiments of the invention, reducing the number of active resources reduces the cooling requirements of Resource Pool (150). Reducing the cooling requirements of Resource Pool (150) may reduce the electrical power consumed by the cooling system.

In one or more embodiments of the invention, Service Level Agreement Repository (110) contains one or more service level agreements (SLAs). A SLA may set forth the expected performance of Resource Pool (150) with respect to executing requests. For example, the rate at which requests are to be executed, the maximum waiting time (i.e., before execution) of any given request, and/or the availability of the resources in Resource Pool (150) to execute requests may be set forth by one or more SLAs. Resource Pool (150) satisfies a SLA when it meets and/or exceeds the expectations set forth by the SLA. Resource Pool (150) may violate a SLA when it does not meet or exceed the expectations set forth by the SLA. The Service Level Agreement Repository (110) may be a database, a flat file, a data structure, or any other type of datastore.

In one or more embodiments of the invention, Resource Management Rules Repository (120) contains one or more rules regarding management of the resources in Resource Pool (150). For example, a resource management rule may set forth the minimum number of resources that must be active at any given time, the minimum number of a specific type of resource (e.g., servers) that must be active at any given time, the maximum number of a specific resource (e.g., mainframes) that may be active at any given time, etc. In one or more embodiments of the invention, a validation check is performed (e.g., by a user) to determine whether Resource Pool (150) is operating in accordance with a resource management rule. The Resource Management Rules Repository (120) may be a database, a flat file, a data structure, or any type of datastore. In one or more embodiments of the invention, Resource Management Rules Repository (120) and Service Level Agreement Repository (110) are a single datastore internal to or external to Load Manager (140).

In one or more embodiments of the invention, User Interface (130) is configured to accept one or more inputs from a user (not shown) via keyboard, mouse, microphone, or any other input device. User Interface (130) may be a graphical user interface. User Interface (130) may provide a user with the ability to access and/or modify the contents of Resource Management Rules Repository (120) and/or Service Level Agreement Repository (110). User Interface (130) may further provide a user with the ability to change the operating mode of one or more resources in Resource Pool (150). User Interface (130) may further still provide a user with the ability to specify one or more load thresholds for use by Load Manager (140). In one or more embodiments of the invention, once a load threshold is selected, the load threshold is a fixed (i.e., static) value that can be compared with one or more load values (discussed below). In one or more embodiments of the invention, User Interface (130) allows a user to access electrical power consumption statistics associated with Resource Pool (150).

In one or more embodiments of the invention, Load Manager (140) provides one or more interfaces to connect Resource Management Rules Repository (120), Service Level Agreement Repository (110), User Interface (130), and Resource Pool (150). Load Manager (140) may be configured to measure the computational load (i.e., the load value) (discussed above) associated with Resource Pool (150).

In one or more embodiments of the invention, Load Manager (140) is configured to change the operational mode of one or more of the resources in Resource Pool (150). In other words, Load Manager (140) may be configured to activate a resource in sleep mode, deactivate a resource in active mode, etc. In one or more embodiments of the invention, Load Manager (140) is configured to monitor the electric power consumption of Resource Pool (150) and calculate statistics associated with electric power consumption (e.g., kWh).

In one or more embodiments of the invention, Load Manager (140) is configured to calculate a service level metric (SL Metric) associated with Resource Pool (150). In other words, Load Manager (140) may be configured to obtain a metric representing the rate at which requests are executed, the maximum waiting time of a request, and the availability of resources in Resource Pool (150), etc. The SL Metric may be compared against a service level agreement to determine whether the service level agreement is satisfied.

In one or more embodiments of the invention, Load Manager (140) is configured to operate Resource Pool (150) in accordance with a resource management rule. In other words, although Load Manager (140) may be configured to change the operational modes of resources in Resource Pool (150), any changes to Resource Pool (150) may be constrained by a resource management rule. Accordingly, Load Manager (140) may be configured to compare the existing state (e.g., the present operational mode of the resources in Resource Pool (150)) with a resource management rule.

Figure 2:
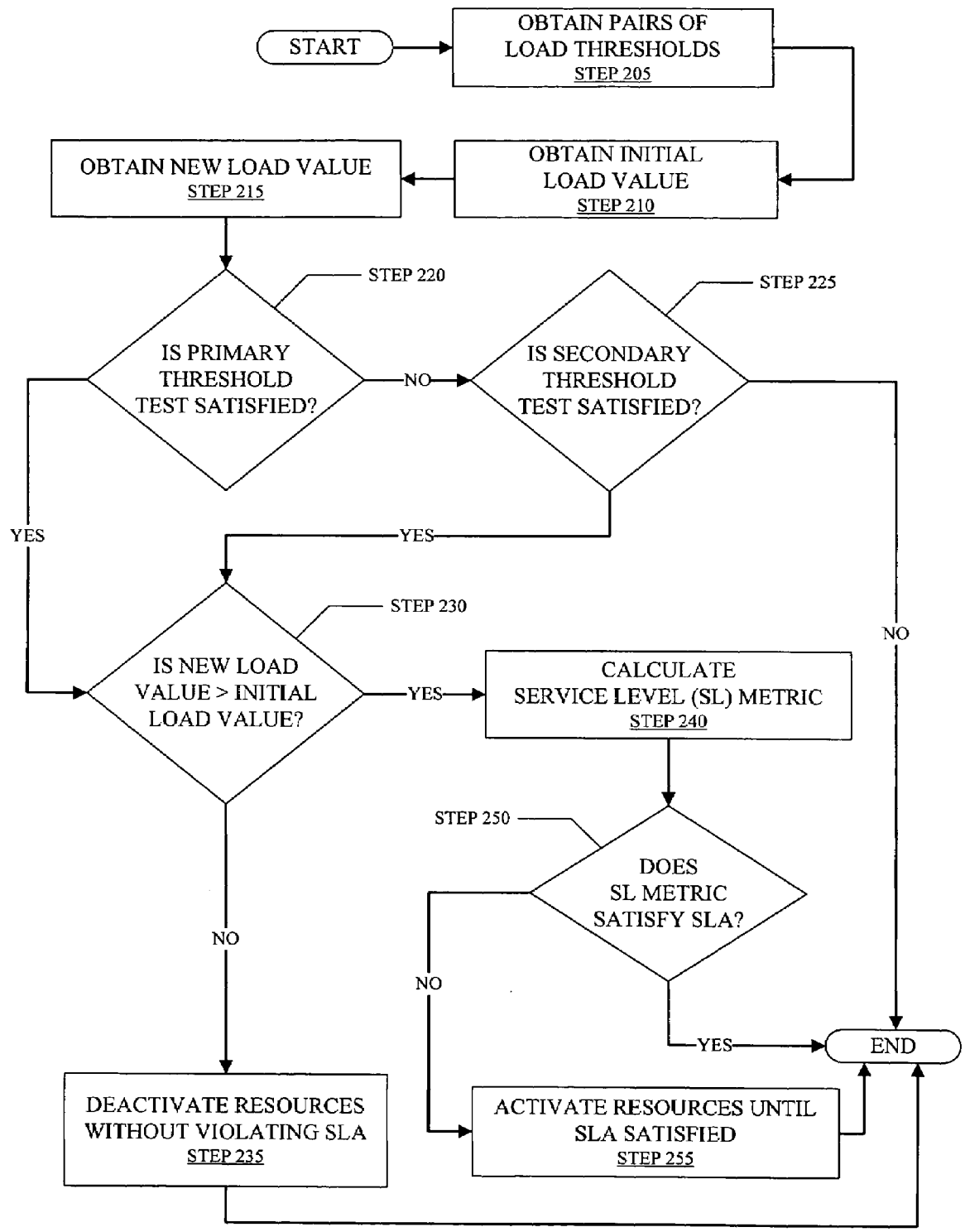
FIG. 2 shows a flowchart in accordance with one or more embodiments of the invention.

FIG. 2 shows a flowchart in accordance with one or more embodiments of the invention. Initially, multiple load thresholds are obtained (STEP 205). The multiple load thresholds may be obtained from a user (e.g., a system administrator). The multiple load thresholds may be specified in pairs. In one or more embodiments of the invention, load thresholds already exist prior to executing the process shown in FIG. 2. In such embodiments, STEP 205 may be skipped and the process commences at STEP 210.

In STEP 210, an initial load value is obtained. As discussed above, a load value is a measurement representing the computational load associated with a resource pool. In one or more embodiments of the invention, the initial load value represents the current computational load associated with the resource pool. In one or more embodiments of the invention, the initial load value represents the computation load associated with the resource pool at a time prior to starting the process shown in FIG. 2. In one or more embodiments of the invention, the initial load value may be the last known measurement representing the computational load associated with the resource pool.

In STEP 215, a new load value is obtained. The new load value may be obtained at any time following the initial load value. For example, the new load value may be obtained five seconds, 7 minutes, or 0.75 hours after obtaining the initial load value. In one or more embodiments of the invention, the new load value is a measurement representing the current computational load associated with the resource pool.

In STEP 220, it is determined whether the primary threshold test is satisfied. As discussed above, load thresholds may be specified in pairs, and a load threshold is a selected load value. In one or more embodiments of the invention, the primary threshold test is satisfied when at least one specified pair of load thresholds falls between the initial load value and the new load value. If at least one specified pair of load thresholds falls between the initial load value and the new load value, the process proceeds to STEP 230. If none of the specified pairs of load thresholds fall between the initial load value and the new load value, the process proceeds to STEP 225.

In STEP 225, it is determined whether the secondary threshold test is satisfied. In one or more embodiments of the invention, the secondary threshold test is satisfied when the initial load value falls between a specified pair of load thresholds AND there is at least one threshold between the initial load value and the new load value. If the secondary threshold test is satisfied, the process proceeds to STEP 230. If the secondary threshold test is not satisfied, the process ends.

In STEP 230, it is determined whether the new load value is greater than the initial load value. If the new load value is greater than the initial load value, the process proceeds to STEP 240. However, if the new load value is smaller than the initial load value, the process proceeds to STEP 235.

In STEP 240, a service level (SL) metric associated with the resource pool is calculated. In STEP 250, it is determined whether the calculated SL metric (STEP 240) satisfies a service level agreement (SLA). In other words, the SL metric may be compared against one or more SLAs. If the one or more SLAs are satisfied, the process ends. If the one or more SLAs are not satisfied, additional resources in the resource pool are activated until the SLA is satisfied (STEP 255).

In one or more embodiments of the invention, the selection of the one or more additional resources to be activated (STEP 255) is determined based on a resource management rule. Consider the following example which is not meant to limit the invention. A resource management rule may permit at most five mainframes in the resource pool to be running at any given time. If five mainframes are presently running and a resource must be activated to satisfy a SLA, one or more resources other than mainframe computers must be selected for activation.

In STEP 235, one or more resources may be deactivated providing the deactivation does not result in a violated SLA. In one or more embodiments of the invention, an attempt is made to deactivate the maximum number of resources while ensuring no SLA is violated. In one or more embodiment of the invention, determining whether one or more SLAs is violated (or satisfied) is essentially the same as STEP 240 and STEP 250.

In one or more embodiments of the invention, one or more resources are deactivated based on a resource management rule. Consider the following example which is not meant to limit the invention. A resource management rule may require a minimum of three servers be running at any given time. If only three servers are presently running and a resource is to be deactivated, a resource other than one of the three servers must be selected for deactivation.

Figure 3:
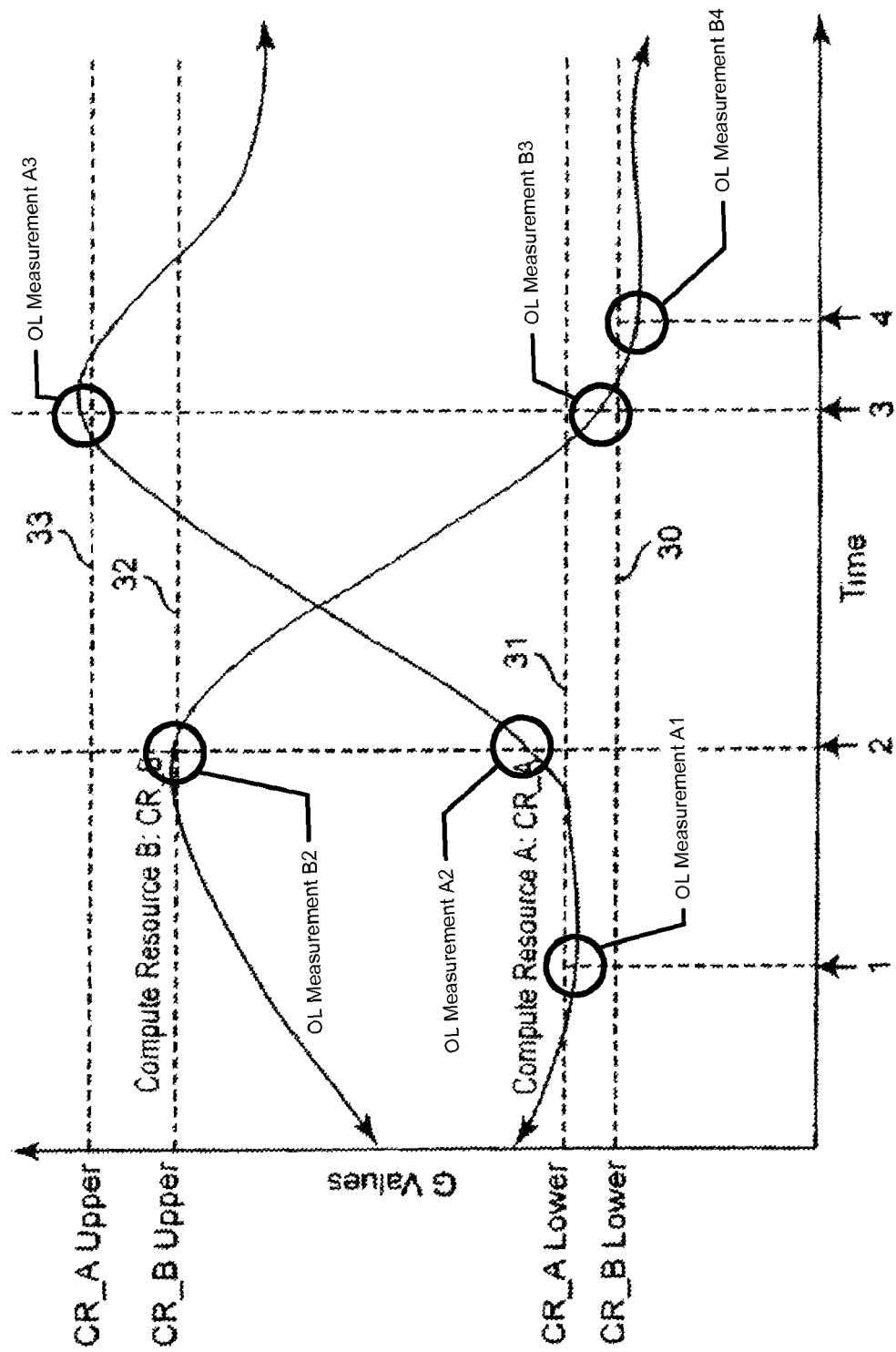
FIG. 3 shows an example in accordance with one or more embodiments of the invention.

Consider the following example which is not intended to limit the invention in any way. As discussed above, a load threshold is a specified load value. A load threshold may be set as any load value between a minimum load value and a maximum expected load value. FIG. 3 shows a load level line in accordance with one or more embodiments of the invention. As shown in FIG. 3, Load Level Line (300) is bounded by the minimum load value (e.g., Min Load (305)) and a maximum expected load value (e.g., Maximum Expected Load (330)). Multiple load thresholds (Load Threshold 1 (310), Load Threshold 2 (315), Load Threshold 3 (320), Load Threshold 4 (325), Load Threshold 5 (326), Load Threshold 6 (327)) have been specified. Load thresholds may be specified in pairs. Accordingly, Load Threshold 1 (310) and Load Threshold 2 (315) may have been specified as a pair of load thresholds. Similarly, Load Threshold 3 (320) and Load Threshold 4 (325) may have been specified as pair of load thresholds.

At an initial time, $t_0$, the computational load associated with the resource pool is measured as Load Value 1 (342). At some time after $t_0$, the computational load associated with the resource pool is measured as Load Value 2 (344). None of the specified pairs of load thresholds fall between Load Value 1 (342) and Load Value 2 (344) (i.e., primary threshold test is not satisfied). Further, Load Value 1 (342) does not fall between a specified pair of load thresholds (i.e., secondary threshold test is not satisfied). Accordingly, none of the resources in the resource pool are activated or deactivated because neither the primary threshold test nor the secondary threshold test are satisfied. In other words, the current operational modes of the resources in the resource pool do not change.

At an initial time, $t_0$, the computational load associated with the resource pool is measured as Load Value 1 (342). At a time after $t_0$, the computational load associated with the resource pool is measured as Load Value 3 (346). Since at least one specified pair of load thresholds falls between Load Value 1 (342) and Load Value 3 (346) (i.e., primary threshold test is satisfied), and Load Value 3 (346) is greater than Load Value 1 (342), one or more resources may be activated if a SLA is not being satisfied.

At an initial time, $t_0$, the computational load associated with the resource pool is measured as Load Value 2 (344). At a time after $t_0$, the computational load associated with the resource pool is measured as Load Value 1 (342). None of the specified pairs of load thresholds fall between Load Value 1 (342) and Load Value 2 (344) (i.e., primary threshold test is not satisfied). However, since Load Value 2 (344) is the initial load value, Load Value 2 (344) falls between a specified pair of load thresholds, and there is at least one threshold between Load Value 2 (344) and Load Value 1 (342), the secondary threshold test is satisfied. Accordingly, one or more resources may be activated if a SLA is not being satisfied.

In one or more embodiments of the invention, electric power consumed by the resource pool and/or a cooling system cooling the resource pool may be reduced because the number of resources in active mode is reduced. In one or more embodiments of the invention, the use of multiple load thresholds (e.g., Load Threshold 1 (210), Load Threshold 2 (215)) avoids excessive changing of the operational mode of one or more resources.

Figure 4:
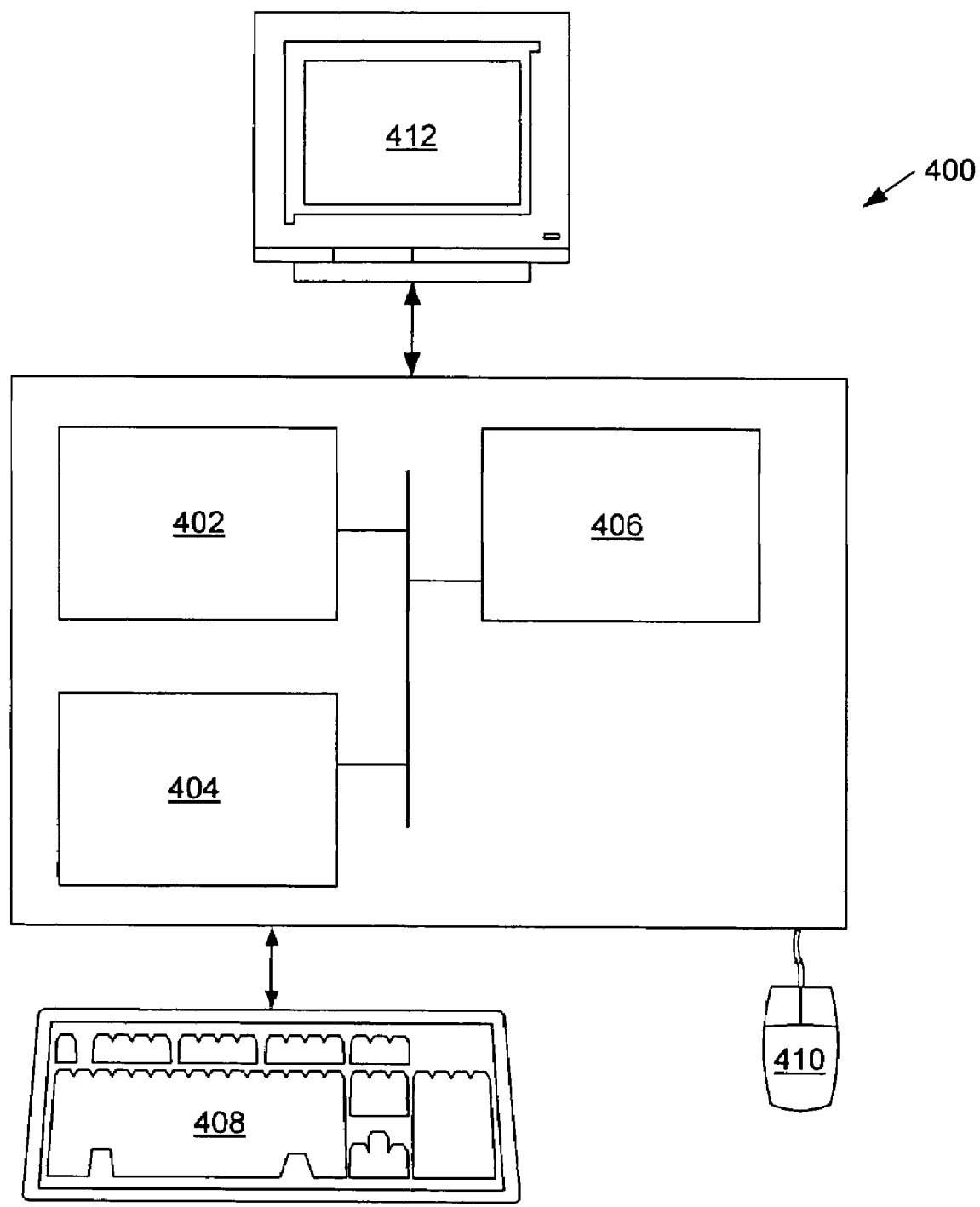
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., Load Manager, User Interface, Resource Management Rules Repository) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing a plurality of computing resources comprising:
   obtaining a first load threshold, a second load threshold, and a third load threshold,
       wherein the first load threshold, the second load threshold, and the third load threshold represent computational loads associated with the plurality of computing resources, and
       wherein the first load threshold and the second load threshold are a specified pair of load thresholds;
   obtaining a first load value at a first time value, wherein the first load value is a measurement of the computational load of the plurality of computing resources;
   obtaining a second load value at a second time value,
       wherein the second load value is a measurement of the computational load of the plurality of computing resources, and
       wherein the second time value is after the first time value;
   comparing the first load threshold, the second load threshold, and the third load threshold with the first load value and the second load value;
   making a first determination that the specified pair of load thresholds are not between the first load value and the second load value;
   making a second determination that the first load value is not between the specified pair of load thresholds, wherein the second determination comprises:
       determining that the first load value is between the second load threshold and the third load threshold; and
       determining that the second load threshold and the third load threshold are not the specified pair of load thresholds;
   making a third determination that the second load value is between the specified pair of load thresholds, wherein the third determination comprises:
       determining that the second load value is between the first load threshold and the second load threshold; and
       determining that the first load threshold and the second load threshold are the specified pair of load thresholds;
   making a fourth determination that the second load threshold is between the first load value and the second load value; and
   changing, based on the first determination, the second determination, the third determination, and the fourth determination, an operating mode of a first resource of the plurality of computing resources.

2. The method of claim 1, wherein changing the operating mode of the first resource comprises:
   obtaining a service level metric associated with the plurality of computing resources;
   comparing the service level metric with a service level agreement to generate a service level comparison; and
   activating the first resource based on the service level comparison.

3. The method of claim 1, wherein changing the operating mode of the first resource comprises:
   deactivating the first resource based on a service level agreement, wherein the service level agreement is satisfied after deactivating the first resource.

4. The method of claim 1, wherein the operating mode of the first resource is associated with electrical power consumption.

5. The method of claim 1, wherein changing the operating mode of the first resource is further based on a set of resource management rules.

6. The method of claim 1, wherein changing the operating mode of the first resource changes electrical power consumption of a cooling system associated with the plurality of computing resources.

7. A non-transitory computer readable medium storing instructions for managing a plurality of resources, the instructions comprising functionality to:
   obtain a first load threshold, a second load threshold, and a third load threshold,
       wherein the first load threshold, the second load threshold, and the third load threshold represent computational loads associated with the plurality of computing resources, and
       wherein the first load threshold and the second load threshold are a specified pair of load thresholds;
   obtain a first load value at a first time value, wherein the first load value is a measurement of the computational load of the plurality of computing resources;
   obtain a second load value at a second time value,
       wherein the second load value is a measurement of the computational load of the plurality of computing resources, and
       wherein the second time value is after the first time value;
   compare the first load threshold, the second load threshold, and the third load threshold with the first load value and the second load value;
   make a first determination that the specified pair of load thresholds are not between the first load value and the second load value;
   make a second determination that the first load value is not between the specified pair of load thresholds, wherein the second determination comprises:

determining that the first load value is between the second load threshold and the third load threshold; and determining that the second load threshold and the third load threshold are not the specified pair of load thresholds;

make a third determination that the second load value is between the specified pair of load thresholds, wherein the third determination comprises:

determining that the second load value is between the first load threshold and the second load threshold; and determining that the first load threshold and the second load threshold are the specified pair of load thresholds:, make a fourth determination that the second load threshold is between the first load value and the second load value; and change, based on the first determination, the second determination, the third determination, and the fourth determination, an operating mode of a first resource of the plurality of computing resources.

8. The non-transitory computer readable medium of claim 7, the instructions for changing the operating mode of the first resource comprising functionality to:

obtain a service level metric associated with the plurality of computing resources;

compare the service level metric with a service level agreement to generate a service level comparison; and activate the first resource based on the service level comparison.

9. The non-transitory computer readable medium of claim 7, the instructions for changing the operating mode of the first resource comprising functionality to:

deactivate the first resource based on a service level agreement, wherein the service level agreement is satisfied after deactivating the first resource.

10. The non-transitory computer readable medium of claim 7, wherein changing the operating mode of the first resource changes electrical power consumption of a cooling system associated with the plurality of computing resources.

11. The non-transitory computer readable medium of claim 7, wherein changing the operating mode of the first resource is further based on a set of resource management rules.

12. A system for managing a plurality of computing resources comprising:

a user interface;

a service level agreement; and a load manager accessible by the user interface with functionality to:

obtain a first load threshold, a second load threshold, and a third load threshold, wherein the first load threshold, the second load threshold, and the third load threshold represent computational loads associated with the plurality of computing resources, and wherein the first load threshold and the second load threshold are a specified pair of load thresholds;

obtain a first load value at a first time value, wherein the first load value is a measurement of the computational load of the plurality of computing resources;

obtain a second load value at a second time value, wherein the second load value is a measurement of the computational load of the plurality of computing resources, and wherein the second time value is after the first time value;

compare the first load threshold, the second load threshold, and the third load threshold with the first load value and the second load value;

make a first determination that the specified pair of load thresholds are not between the first load value and the second load value;

make a second determination that the first load value is not between the specified pair of load thresholds, wherein the second determination comprises:

determining that the first load value is between the second load threshold and the third load threshold; and determining that the second load threshold and the third load threshold are not the specified pair of load thresholds;

make a third determination that the second load value is between the specified pair of load thresholds, wherein the third determination comprises:

determining that the second load value is between the first load threshold and the second load threshold; and determining that the first load threshold and the second load threshold are the specified pair of load thresholds;

make a fourth determination that the second load threshold is between the first load value and the second load value; and change, based on the first determination, the second determination, the third determination, and the fourth determination, an operating mode of a first resource of the plurality of computing resources.

13. The system of claim 12, further comprising:

a resource management rule repository associated with at least one selected from the group consisting of the plurality of computing resources and the load manager.

14. The system of claim 12, wherein the load manager further comprises functionality to:

obtain a service level metric associated with the plurality of computing resources;

compare the service level metric with the service level agreement to generate a service level comparison; and activate the first resource based on the service level comparison.

15. The system of claim 12, wherein the load manager further comprises functionality to:

deactivate the first resource based on the service level agreement, wherein the service level agreement is satisfied after deactivating the first resource.

16. The system of claim 12, wherein the plurality of computing resources forms a grid cluster.

17. The system of claim 12, further comprising:

a cooling system associated with the plurality of computing resources, wherein changing the operating mode of the first resource changes electrical power consumed by the cooling system.

* * * * *